United States Patent [19]

Chuah et al.

[11] Patent Number: 5,326,509
[45] Date of Patent: Jul. 5, 1994

[54] FABRICATION OF BENZBISAZOLE POLYMERS INTO MONOLITHIC ARTICLES

[75] Inventors: Hoe H. Chuah, Houston, Tex.; Ivan J. Goldfarb, Dayton, Ohio

[73] Assignee: The United States of America as represented by the Secretary of the Air Force, Washington, D.C.

[21] Appl. No.: 134,194

[22] Filed: Oct. 7, 1993

[51] Int. Cl.$^5$ .............................................. B29C 39/02
[52] U.S. Cl. ...................................... 264/28; 264/101; 264/235; 264/331.12; 264/344
[58] Field of Search ................... 264/28, 41, 101, 102, 264/234, 235, 331.12, 344, 345, 346

[56] References Cited

U.S. PATENT DOCUMENTS

| | | | |
|---|---|---|---|
| 4,207,407 | 6/1980 | Helminiak et al. | 525/425 |
| 4,377,546 | 3/1983 | Helminiak et al. | 264/234 X |
| 4,487,735 | 12/1984 | Chenevey et al. | 264/331.12 X |
| 4,606,875 | 8/1986 | Chenevey et al. | 264/331.12 X |
| 4,845,150 | 7/1989 | Kovak et al. | 524/602 |
| 4,898,924 | 2/1990 | Chenevey et al. | 264/331:12 X |
| 4,939,235 | 7/1990 | Harvey et al. | 528/337 |
| 4,963,428 | 10/1990 | Harvey et al. | 428/220 |
| 4,973,442 | 11/1990 | Harvey et al. | 264/102 X |
| 4,977,223 | 12/1990 | Arnold et al. | 264/331.12 X |

*Primary Examiner*—Leo B. Tentoni
*Attorney, Agent, or Firm*—Bernard E. Franz; Thomas L. Kundert

[57] ABSTRACT

A method for fabricating a monolithic polybenzbisazole article including the steps of:
(a) dissolving at least one benzbisazole polymer in a strong acid at an elevated temperature;
(b) transferring the resulting solution to a mold;
(c) cooling the solution in the mold to a temperature below the gelation temperature of the acid-polymer mixture, thus providing a polymer-acid gel;
(d) ageing the gel for about 0.25 to 10 days;
(e) replacing the acid in the gel with water;
(f) replacing the water in the gel with a lower aliphatic alcohol; and
(g) densifying the gel.

5 Claims, No Drawings

FABRICATION OF BENZBISAZOLE POLYMERS INTO MONOLITHIC ARTICLES

RIGHTS OF THE GOVERNMENT

The invention described herein may be manufactured and used by or for the Government of the United States for all governmental purposes without the payment of any royalty.

BACKGROUND OF THE INVENTION

This invention relates to the fabrication of monolithic articles using aromatic heterocyclic polymers and copolymers.

Rod-like aromatic heterocyclic polymers, as well as copolymers, are widely described in the literature. They have the potential for replacing the state-of-the-art structural materials. These polymers have repeating units of the general formula -Bz-Ar-, wherein Bz is a benzbisazole group of the formula:

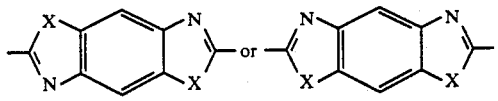

wherein X is -S-, -O- or -NH-; and wherein Ar is a para-oriented aromatic group such as

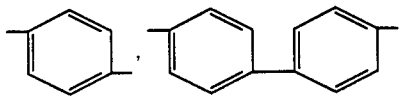

or the like, including substituted moieties thereof. For example, poly(p-phenylene benzobisthiazole) (PBT) has superior mechanical properties and thermal stability. These polymers and copolymers are linear, and in the art are called rod-like, because the right-most bond of the repeating unit is parallel, and preferably uniaxial, with the left-most bond, regardless of the rotational aspect of the components of the unit.

However, the rigid-rod polymers and copolymers do not melt and do not possess a glass transition temperature, thus limiting their processing capability. They dissolve in strong acids and are normally processed in the solution state. They are recovered from the solution state by coagulating the polymer or copolymer with water. Inasmuch as the mixing of acid and water is exothermic, the heat generated causes void formation. Thus, the polymers and copolymers can only be processed into thin films or fibers. Bulk coagulation is difficult, if not impossible, because of void formation.

Chopped fiber reinforced plastics are currently being used in the fabrication of a wide variety of components. There are several disadvantages in the use of fiber for the reinforcement of plastic. In the case of chopped glass fibers, a large amount of fiber, generally a minimum of 30 percent by weight, is necessary for reinforcement because of the low reinforcing effect of the fiber. There is a practical processing limit on the effective fiber length. A macroscopically long fiber length is required with due regard for breaking or destruction of the fiber during processing, particularly molding.

Composite materials containing chopped fibers are generally less processable than their non-reinforced counterparts. The shape of moldings is often limited to simple block or sheet forms. Films or filaments cannot be formed from chopped glass fiber-reinforced plastics. Other disadvantages of these materials include poor surface properties of molded articles, an anisotropy in dynamic properties, molding defects due to heterogeneity of the polymeric materials, and low cycle time in processing.

A need exists for high strength reinforced composites and a method for their manufacture which possess at least the following desirable prerequisites: (1) non-reliance on fiber reinforcement for the attainment of high strength properties; (2) circumvention of the complexities of current composite fabrication procedures; and (3) elimination of any possibility of fiber-polymer interface problems.

Various attempts have been made to overcome some of the above-described disadvantages of chopped-fiber reinforced plastics. One approach described by Helminiak et al, U.S. Pat. Nos. 4,207,407 and 4,377,546, comprises the dispersion of an intrinsically rigid rod-like heterocyclic polymer in a flexible, coil-like heterocyclic polymer. The result is termed a molecular composite.

The flexible coil polymers referred to above can be benzazole polymers having repeating units of the formula:

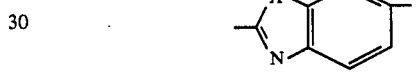

wherein X is as described above, or benzbisazole polymers having repeating units of the general formula -Bz-Ar'-, wherein Bz is as described above and Ar' is a non-para-oriented aromatic group such as:

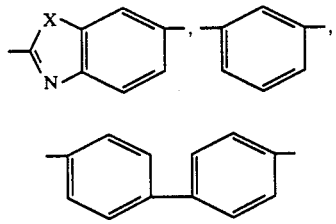

or the like, including substituted moieties thereof.

While the molecular composite approach represents a valuable contribution to the art, it has certain drawbacks. As noted previously, poly(p-phenylene benzobisthiazole) (PBT) has superior mechanical properties and thermal stability. However, PBT degrades before it melts; therefore, processing of a composite containing PBT must be carried out in a solution state with an acid, such as methanesulfonic acid (MSA), as the solvent. Relatively few flexible coil polymers can be dissolved in or are stable in MSA, thus limiting the choice of matrix polymers. Molecular composites based on PBT and poly-2,5-benzimidazole (ABPBI) have been fabricated into fibers and thin films. However, ABPBI does not have a glass transition temperature ($T_g$). Therefore, molecular composites containing ABPBI are difficult to thermally consolidate into thicker specimens. To overcome this problem, thermoplastic matrices have been used so that the molecular composite films could be laminated. One approach described by Arnold et al, U.S. Pat. No. 4,977,223, comprises the dispersion of a rigid-rod aromatic heterocyclic polymer in a mixture of a thermoplastic polymer and a thermosetting polymer. However, thicker specimens fabricated using thermoplastic matrices are limited to use at temperatures below the $T_g$ of the matrix polymer(s). Conventional thermoset resins, such as bismaleimides, epoxies and the like, are not stable in the acid medium used to process the rigid-rod polymer, and cannot be used as host matrices for molecular composites.

Another drawback to molecular composites has to do with the propensity of the rod-like materials to agglomerate. Serious agglomeration can lead to structural failure.

Accordingly, it is an object of this invention to provide a novel method for producing monolithic articles using rigid-rod polymers.

It is another object of this invention to provide a method for producing monolithic articles using a molecular composite.

Other objects, aspects and advantages of the present invention will become apparent to those skilled in the art from a reading of the following detailed description of the invention.

SUMMARY OF THE INVENTION

In accordance with the present invention there is provided a method for fabricating a monolithic polybenzbisazole article comprising the steps of:

(a) dissolving at least one benzbisazole polymer in a strong acid at an elevated temperature;
(b) transferring the resulting solution to a mold;
(c) cooling the solution in the mold to a temperature below the gelation temperature of the acid-polymer mixture, thus providing a polymer-acid gel;
(d) ageing the gel for about 0.25 to 10 days;
(e) replacing the acid in the gel with water;
(f) replacing the water in the gel with a lower aliphatic alcohol; and
(g) densifying the gel.

DESCRIPTION OF THE INVENTION

The linear and flexible aromatic heterocyclic polymers and copolymers can be prepared by any method known in the art. Unless otherwise noted, the linear or flexible aromatic heterocyclic polymers or copolymers, or mixtures thereof, are hereinafter referred to by the term polymer.

The polymer is first dissolved at an elevated temperature in a strong acid. Any acid which will dissolve the polymer without altering the polymer structure or otherwise affecting the stability of the polymer may be used. Suitable strong acids include concentrated sulfuric acid, methanesulfonic acid (MSA), chlorosulfonic acid (CSA), polyphosphoric acid (PPA), hydrochloric acid, nitric acid, hydrofluoric acid and the like, as well as mixtures thereof. The temperature for dissolving the polymer is about 130° to 170° C. The concentration of the polymer in the acid is preferably at least 1 weight percent and not more than about 10 weight percent. A concentration of about 1 to 8 weight percent covers both isotropic and anisotropic solutions.

Once the polymer is in solution, a suitable mold is filled with the solution to a desired depth. It is preferred, though optional, to degas the solution in the mold. Degassing should be carried out under vacuum, at an elevated temperature, i.e., a temperature at least sufficient to maintain the polymer in solution, for about 0.5 to 5 hours.

The polymer solution is then cooled to a temperature below the gelation temperature of the polymer. The gelation temperature varies from about 70° to 120° C. depending on the concentration of the polymer in the acid. Under most circumstances it will be sufficient to cool the solution to room temperature. On cooling through and below the gelation temperature a thermally reversible gel forms.

The thus-formed gel is allowed to remain quiescent, i.e., aged, for about 0.25 to 10 days. During this period a position of the acid is expelled from the gel by syneresis, accompanied by volume shrinkage. Syneresis can be aided by exposing the gel to atmospheric moisture or by humidifying the gel under controlled conditions.

The acid remaining in the gel is then replaced with water, such as by repeated washing of the gel. This step is not unlike the coagulation step in the preparation of the polymer or the coagulation step in the fabrication of film or fiber. The gel is sufficiently rigid that the water can replace the acid without catastrophic collapse of the molecular network of the polymer. Following this replacement, the gel is called a coagulated gel. The water and any residual acid in the coagulated gel is then replaced with a lower aliphatic alcohol, such as methanol, ethanol, propanol or isopropanol. This alcohol replacement can be accomplished by refluxing the gel with the alcohol in a suitable extraction apparatus.

The coagulated gel is then densified into solid articles of different densities by one of three methods:

The alcohol can be replaced with a non-polar solvent, such as benzene. Following replacement, the article can be freeze dried to remove the solvent, without collapsing the polymer networks. The resulting article is microporous and has a low density.

Alternatively, the coagulated gel can be dried, under vacuum and at an elevated temperature. As a result of such drying, the polymer network collapses, thereby reducing the size of the micropores and increasing the density of the article.

Another alternative is to mold the coagulated gel at elevated temperature and pressure. Through control of the molding cycle, the gel can be consolidated into an article of desired shape and density.

Following densification, the article can be heat treated at about 450° to 550° C. for about 5 to 120 minutes to relieve andy stresses in the article.

The method of this invention can be used to fabricate a variety of monolithic aromatic heterocyclic articles. For example, the coagulated gel can be molded at elevated temperature and pressure to provide sheetstock which can be used for printed circuit board applications. Alternatively, the gel can be molded into a monolithic block which can be machined into shaped articles.

Various modifications may be made to the invention as described without departing from the spirit of the invention or the scope of the appended claims.

We claim:
1. A method for fabricating a monolithic polybenzbisazole article comprising the steps of:
(a) dissolving at least one benzbisazole polymer in a strong acid at an elevated temperature;
(b) transferring the resulting solution to a mold;
(c) cooling the solution in mold to a temperature below the gelation temperature of the acid-polymer mixture, thus providing a polymer-acid gel;

(d) ageing the gel for about 0.25 to 10 days;
(e) replacing the acid in the gel with water thus providing a coagulated gel;
(f) replacing the water in the gel with a lower aliphatic alcohol; and
(g) densifying the gel, thus providing said monolithic article.

2. The method of claim 1 wherein the gel is densified by replacing the alcohol with a non-polar solvent, and freeze-drying the article to remove the solvent.

3. The method of claim 1 wherein the gel is densified by drying the coagulated gel under vacuum and at an elevated temperature.

4. The method of claim 1 wherein the gel is densified by molding the coagulated gel at elevated temperature and pressure into an article of desired shape and density.

5. The method of claim 1 wherein the article is heat treated at about 450° to 550° C. for about 5 to 120 minutes following densification.

* * * * *